US006999633B1

(12) United States Patent
Kondo et al.

(10) Patent No.: US 6,999,633 B1
(45) Date of Patent: Feb. 14, 2006

(54) DATA PROCESSING APPARATUS AND METHOD

(75) Inventors: Tetsujiro Kondo, Tokyo (JP); Kenji Tanaka, Chiba (JP); Koji Ohta, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/500,356

(22) Filed: Feb. 7, 2000

(30) Foreign Application Priority Data

Feb. 9, 1999 (JP) ................................. 11-031121

(51) Int. Cl.
*G06K 9/40* (2006.01)
(52) U.S. Cl. ....................... 382/275; 382/190; 382/268
(58) Field of Classification Search ................ 382/115, 382/159, 190, 209, 217–220, 236, 239, 254, 382/261, 268, 269, 275; 348/193, 404.1; 375/240.02, 240.27, 24
See application file for complete search history.

(56) References Cited

U.S. PATENT DOCUMENTS

| | | | | |
|---|---|---|---|---|
| 4,972,499 A | * | 11/1990 | Kurosawa | 382/227 |
| 4,991,223 A | * | 2/1991 | Bradley | 382/165 |
| 5,602,934 A | | 2/1997 | Li et al. | 382/128 |
| 5,796,876 A | * | 8/1998 | Wang et al. | 382/270 |
| 5,917,940 A | * | 6/1999 | Okajima et al. | 382/173 |
| 6,128,407 A | * | 10/2000 | Inoue et al. | 382/167 |
| 6,154,566 A | * | 11/2000 | Mine et al. | 382/219 |
| 6,263,089 B1 | * | 7/2001 | Otsuka et al. | 382/107 |
| 6,272,250 B1 | * | 8/2001 | Sun et al. | 382/225 |
| 6,285,801 B1 | * | 9/2001 | Mancuso et al. | 382/268 |
| 6,341,179 B1 | * | 1/2002 | Stoyle et al. | 382/254 |
| 6,535,632 B1 | * | 3/2003 | Park et al. | 382/164 |

FOREIGN PATENT DOCUMENTS

EP  0 588 181   3/1994
EP  0 878 776   11/1998

OTHER PUBLICATIONS

Unser, et al. "Weighted averaging of a set of noisy images for maximum signal-to-noise ratio", IEEE, pp. 890-895, 1990.*
Onural L et al: "Gibbs Random Field Model Based Weight Selection for the 2-D Adaptive Weighted Median Filter" IEEE Transactions on Pattern Analysis and Machine Intelligence,US, IEEE Inc. New York, vol. 16, No. 8, Aug. 1, 1994, pp. 831-837, XP000464937 ISSN: 0162-8828.

* cited by examiner

*Primary Examiner*—Daniel Mariam
(74) *Attorney, Agent, or Firm*—Frommer Lawrence & Haug LLP; William S. Frommer; Darren M. Simon

(57) ABSTRACT

A data processing apparatus for processing input data and outputting the processed data as output data effectively reduces noise. An extraction unit extracts similar input data having a value close to given input data. A processing unit processes the input data according to the similar input data extracted by the extraction unit.

18 Claims, 22 Drawing Sheets

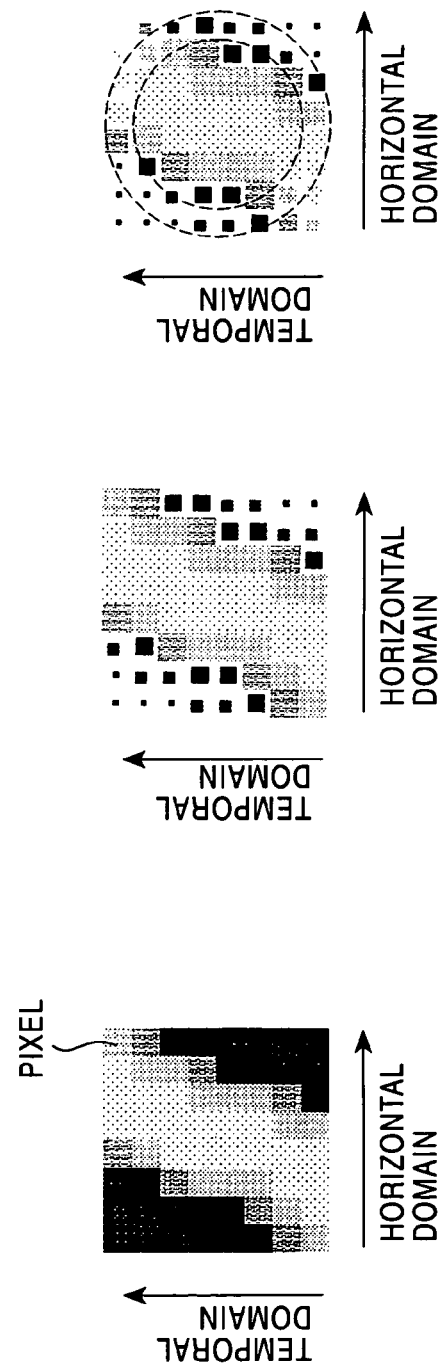

DATA PROCESSING APPARATUS AND METHOD

BACKGROUND OF THE INVENTION

1. Field of the Invention

The present invention generally relates to data processing methods and apparatuses and, more particularly, to a data processing method and a data processing apparatus that allow noise contained in data to be easily and effectively eliminated.

2. Description of the Related Art

Normally, transmitted or read data, such as image data or sound data, contains time-varying noise. Conventionally, for eliminating noise contained in data, the whole input data may be averaged (hereinafter sometimes referred to as "overall average"), local input data may be averaged, which is referred to as "moving average", or a given item of data may be substituted with a median of surrounding data. To reduce noise in images, for example, the following technique is known. One frame is used as a reference frame, and a motion vector of another frame is determined, thereby motion-compensating the second frame by using the motion vector. The weighted mean between the motion-compensated frame and the reference frame is then determined.

However, the above-described conventional techniques of eliminating noise present the following problems.

The technique of calculating the overall average is effective if the degree of noise contained in the data, i.e., the signal-to-noise (S/N) ratio, is constant. However, when the S/N ratio varies, data having a poor S/N ratio adversely influences data having a good S/N ratio, thereby making it difficult to effectively remove noise.

According to the technique of calculating moving averages, the average of data which is temporally close to input data is obtained, and thus, the processing result is susceptible to variations in the S/N ratio. That is, with input data having a high S/N ratio, the processing result also has a high S/N ratio. With input data having a low S/N ratio, the processing result also has a low S/N ratio.

According to the above-described average calculating techniques, the averaged data is smoothed. Accordingly, if this technique is used for eliminating noise in images, portions in which data sharply changes, i.e., sharp edges, are lost.

In the median-substituting technique, the temporal order of data is disturbed, which may seriously impair the characteristics of an original waveform. In using a motion vector, if the motion vector is erroneously detected, the quality of the processed image is considerably deteriorated.

SUMMARY OF THE INVENTION

Accordingly, it is an object of the present invention to solve the above-described problems.

In order to achieve the above object, according to one aspect of the present invention, there is provided a data processing apparatus for processing input data and outputting the processed data as output data. The data processing apparatus includes an extraction unit for extracting from the input data similar input data having a value close to a value of given input data. A processing unit processes the input data according to the similar input data extracted by the extraction unit.

According to another aspect of the present invention, there is provided a data processing method for processing input data and outputting the processed data as output data. The data processing method includes an extraction step of extracting from the input data similar input data having a value close to a value of given input data, and a processing step of processing the input data according to the extracted similar input data.

BRIEF DESCRIPTION OF THE DRAWINGS

FIG. 5A illustrates pixel values to be processed;

FIG. 5B illustrates the concept that weights are applied to pixels having a luminance value similar to that of the given pixel;

FIG. 5C illustrates the concept that further weights are applied to pixels located in the vicinity of the given pixel;

DESCRIPTION OF THE PREFERRED EMBODIMENTS

Figure 1:
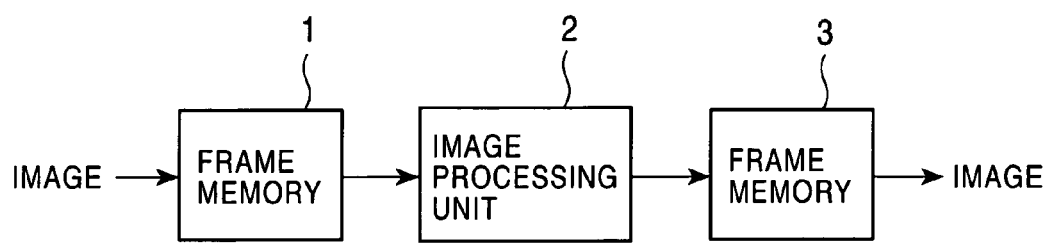
FIG. 1 is a block diagram illustrating the configuration of a noise reduction (NR) processing circuit according to a first embodiment of the present invention.

FIG. 1 is a block diagram illustrating the configuration of a noise reduction (NR) processing circuit according to a first embodiment of the present invention, in which NR processing is performed on images. Images to be NR-processed are first supplied to a frame memory 1 in units of frames. The frame memory 1 has a storage capacity for storing a plurality of frames (for example, 10 to 20 frames) and temporarily stores supplied images. An image processing unit 2 reads the images stored in the frame memory and performs NR processing to reduce noise in the images. The images processed by the image processing unit 2 are supplied to a frame memory 3. The frame memory 3 temporarily stores the images supplied from the image processing unit 2.

Figure 2:
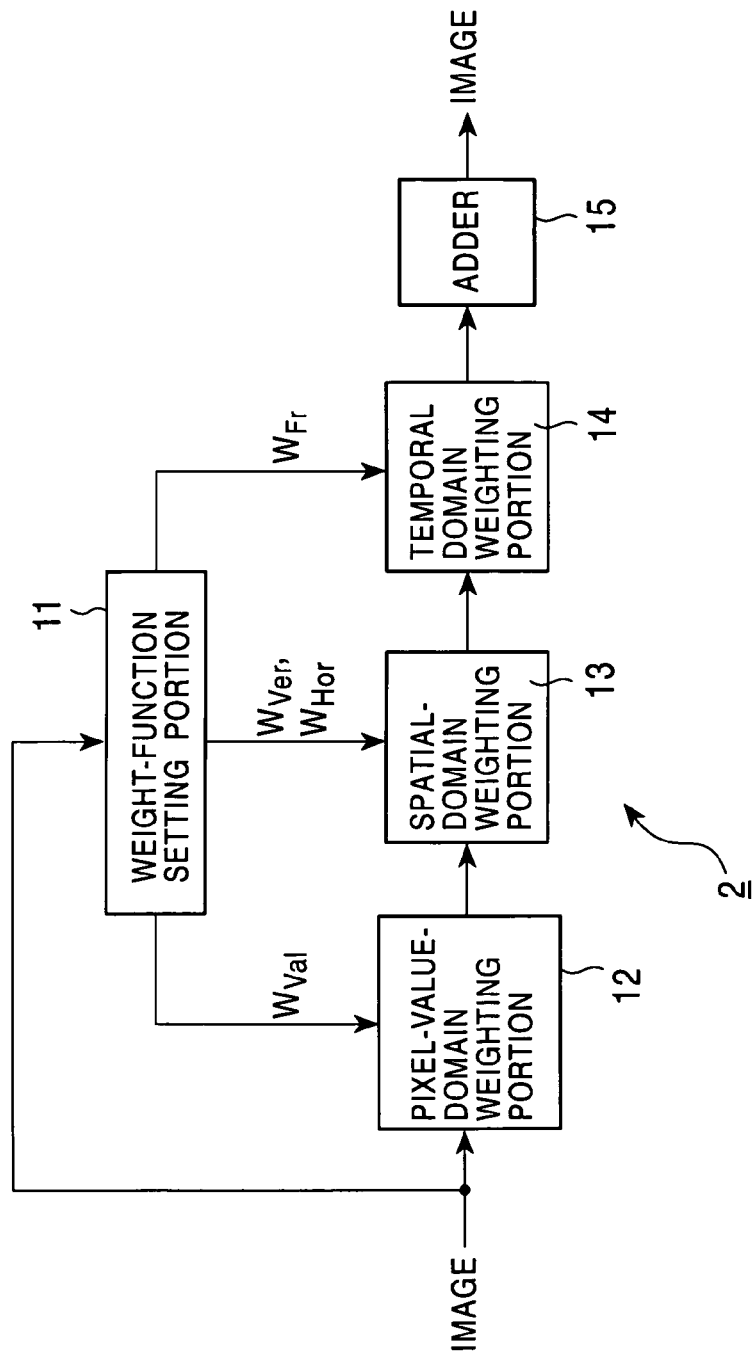
FIG. 2 is a block diagram illustrating the configuration of an image processing circuit shown in FIG. 1.

FIG. 2 illustrates the configuration of the image processing unit 2 shown in FIG. 1. The images stored in the frame memory 1 (FIG. 1) are suitably read and supplied to a weight-function setting portion 11 or a pixel-value-domain weighting portion 12.

The weight-function setting portion 11 adaptively sets a pixel-value-domain weight function $W_{Val}$, a vertical weight function $W_{Ver}$, a horizontal weight function $W_{Hor}$, and a temporal-domain weight function $W_{Fr}$, all of which will be discussed in detail below, and supplies the weight function $W_{Val}$ to the pixel-value-domain weighting portion 12, the weight functions $W_{Ver}$ and $W_{Hor}$ to a spatial-domain weighting portion 13, and the weight function $W_{Fr}$ to a temporal-domain weighting portion 14.

The pixel-value-domain weighting portion 12 weights a received pixel according to the weight function $W_{Val}$ and supplies the weighted pixel to the spatial-domain weighting portion 13. The spatial-domain weighting portion 13 weights the pixel from the pixel-value-domain weighting portion 12 according to the weight functions $W_{Ver}$ and $W_{Hor}$ and supplies the weighted pixel to the temporal-domain weighting portion 14. The temporal-domain weighting portion 14 weights the pixel from the spatial-domain weighting portion 13 according to the weight function $W_{Fr}$ and supplies the weighted pixel to an adder 15. The adder 15 then sequentially adds the pixels (pixel values) supplied from the temporal-domain weighting portion 14 and outputs an added value.

Figure 3:
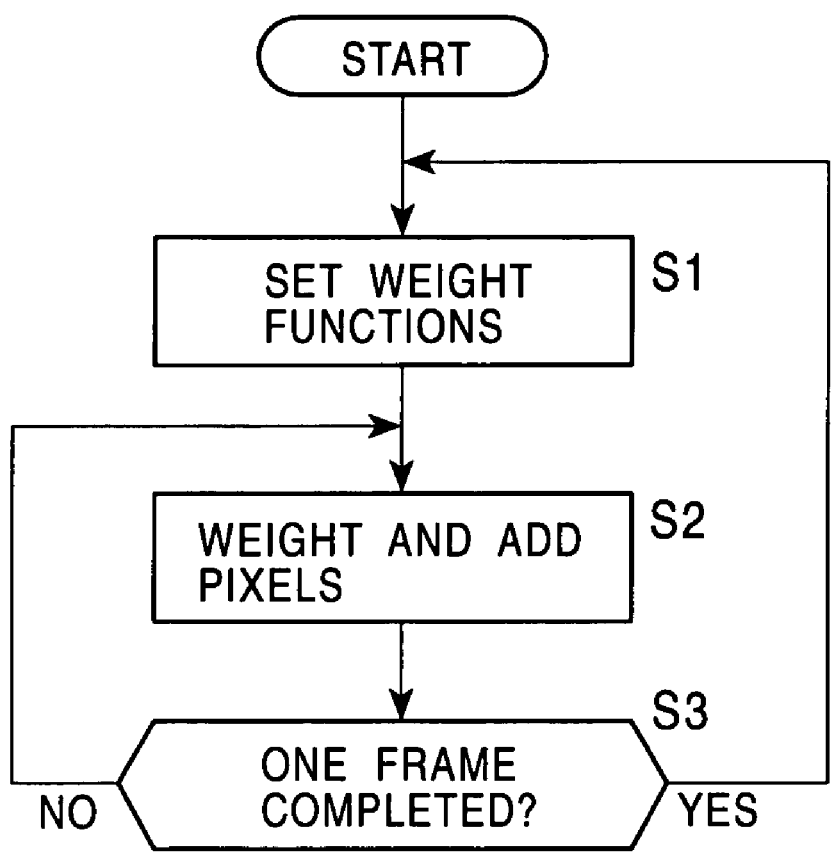
FIG. 3 is a flow chart illustrating the operation of the image processing circuit shown in FIG. 2.

The operation of the image processing unit 2 shown in FIG. 2 is discussed below with reference to the flow chart of FIG. 3.

In step S1, weight functions are set. More specifically, the weight-function setting portion 11 suitably reads an image stored in the frame memory 1 and estimates the level of noise of a current frame. Then, the weight-function setting portion 11 sets the weight functions $W_{Val}$, $W_{Ver}$, $W_{Hor}$, and $W_{Fr}$ based on the estimated level of noise.

In the image processing unit 2, the value of a given pixel is substituted with the sum of a plurality of weighted pixel values, thereby reducing noise. The weight function $W_{Val}$ is used for weighting pixels which substitute a given pixel according to a difference between each of the substitute pixels and the given pixel. In this embodiment, the weight function $W_{Val}$ is expressed by, for example, the following equation f(x) of the Gaussian distribution:

$$f(x)=1/((2\pi)^{1/2}\sigma)\exp(-(x-\mu)^2/(2\sigma^2)) \quad (1)$$

wherein $\mu$ and $\sigma$ indicates the average value and the standard deviation, respectively.

The weight functions $W_{Ver}$, $W_{Hor}$, and $W_{Fr}$ are used for weighting pixels to be processed according to the spatial and temporal distance between the given pixel and each of the pixels to be processed. In this embodiment, the weight functions $W_{Ver}$, $W_{Hor}$, and $W_{Fr}$ are also expressed by the equation (1) of the Gaussian distribution, though they may be given by another type of equation.

Accordingly, the weight function $W_{Val}$ is a function representing a difference sub between a given pixel and a pixel to be processed, and more strictly, it is expressed by $W_{Val}$ (sub). The weight functions $W_{Ver}$, $W_{Hor}$, and $W_{Fr}$ are functions representing the vertical distance j between a given pixel and a pixel to be processed, the horizontal distance i therebetween, and the temporal distance k therebetween, respectively, and more strictly, they are expressed by $W_{Ver}$ (j), $W_{Hor}$(i), and $W_{Fr}$(k) respectively.

Figure 4A:
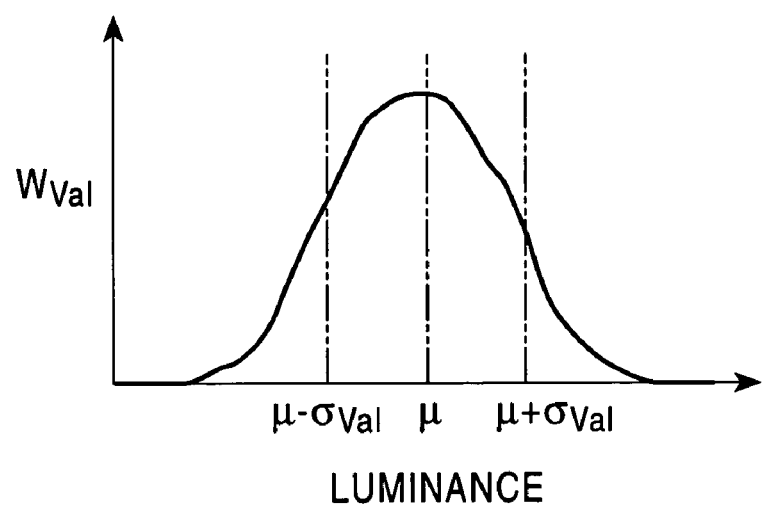
FIG. 4A illustrates a weight function in terms of the luminance.
Figure 4B:
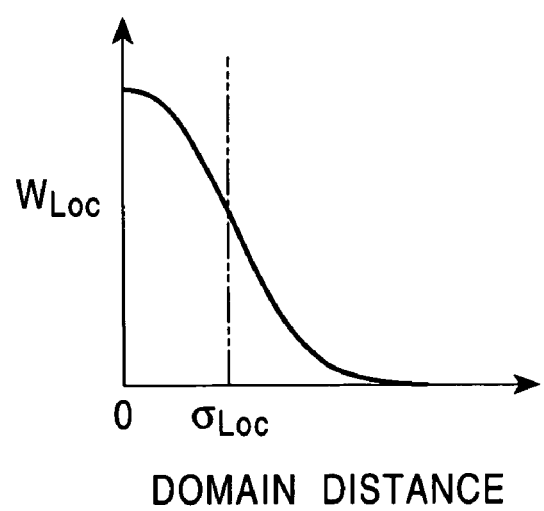
FIG. 4B illustrates weight functions in terms of the distance from a given pixel.

The weight function $W_{Val}$ expressed by the Gaussian distribution is shown in FIG. 4A, in which the horizontal axis indicates the luminance. The weight functions $W_{Ver}$, $W_{Hor}$, and $W_{Fr}$ also expressed by the Gaussian distribution are shown in FIG. 4B, in which the horizontal axis represents the distance of each domain. In FIG. 4B, the weight functions $W_{Ver}$, $W_{Hor}$, and $W_{Fr}$ are collectively indicated by $W_{Loc}$.

In the weight-function setting portion 11, the standard deviation $\sigma$ in equation (1) defining the weight functions $W_{Val}$, $W_{Ver}$, $W_{Hor}$, and $W_{Fr}$ is set based on the estimated level of noise. The resulting weight functions $W_{Val}$, $W_{Ver}$, $W_{Hor}$, and $W_{Fr}$ are supplied to the pixel-value-domain weighting portion 12, the spatial-domain weighting portion 13, and the temporal-domain weighting portion 14. More specifically, the weight function $W_{Val}$ is supplied to the pixel-value-domain weighting portion 12, the weight functions $W_{Ver}$ and $W_{Hor}$ are supplied to the spatial-domain weighting portion 13, and the weight function $W_{Fr}$ is supplied to the temporal-domain weighting portion 14.

Referring back to FIG. 3, in step S2, weights are applied to supplied pixels in the pixel-value-domain weighting portion 12, the spatial-domain weighting portion 13, and the temporal-domain weighting portion 14, and the weighted pixel values are added in the adder 15. The resulting value is output as a new pixel value of the given pixel.

More specifically, it is now assumed that the value of a given pixel from the (y+1)-th row from the top and the (x+1)-th column from the left of the t-th frame among the frames stored in the frame memory 1 be represented by L[t][y][x]. The new value of the given pixel obtained in the above-described weighting portions 12, 13, and 14 and the adder 15 is now indicated by L'[t][y][x] expressed by the following equation.

$$L'[t][y][x] = \sum_{k=-K}^{+K} W_{Fr}(k)\left(\sum_{j=-J}^{+J} W_{Ver}(j)\left(\sum_{i=-I}^{+I} W_{Hor}(i) \times W_{Val}(L[t+k][y+j][x+i]-L[t][y][x]) \times L[t+k][y+j][x+i])\right)\right) \quad (2)$$

Thereafter, the process proceeds to step S3 in which it is determined by a controller (not shown) whether all the pixels in one frame have been processed as a given pixel. If the outcome of step S3 is no, the process returns to step S2 in which the corresponding processing is executed on a pixel to be processed. If it is found in step S3 that all the pixels in one frame have been processed, the process returns to step S1 in which a subsequent frame is processed as a given frame. Thereafter, processing is similarly repeated.

More specifically, in the image processing unit 2 shown in FIG. 2, by applying weights to pixels and adding the weighted pixels, a new value of a given pixel with reduced noise is determined. In the pixel-value-domain weighting portion 12, a weight is applied based on a difference (L[t+k][y+j][x+i]−L[t][y][x]) between a given pixel value L[t][y][x] and a value of a pixel to be processed L[t+k][y+j][x+i].

As a result, a larger weight is applied to a pixel to be processed which is more similar to the given pixel, while a smaller weight is applied to a pixel to be processed which is less similar to the given pixel. That is, in an extreme case, no weight is applied to a pixel which is dissimilar to the given pixel. In this manner, only pixels which are relatively similar to a given pixel are extracted, and the pixels are weighted and added, thereby determining a new value of the original given pixel with reduced noise.

In the spatial-domain weighting portion 13, a weight is applied based on the vertical distance j between the given pixel and a pixel to be processed and the horizontal distance i therebetween. That is, a larger weight is applied to a pixel which is spatially closer to the given pixel, while a smaller weight is applied to a pixel which is spatially farther away from the given pixel.

In the temporal-domain weighting portion 14, a weight is applied based on the temporal distance k between the given pixel and a pixel to be processed. That is, a larger weight is applied to a pixel which is temporally closer to the given pixel, while a smaller weight is applied to a pixel which is temporally farther away from the given pixel.

As discussed above, a greater weight is applied to pixels spatially and temporally close to the given pixel, and no weight is applied to pixels spatially and temporally far from the given pixel.

Thus, referring to FIGS. 5A, 5B, and 5C, pixels having values (luminance) similar to a given pixel are first extracted, as illustrated in FIG. 5B, and among the extracted pixels, pixels spatially and temporally close to the given pixel are extracted, as illustrated in FIG. 5C. The extracted pixels are weighted and added, and a resulting value is determined to be a new value of the given pixel. Accordingly, noise contained in the given pixel can be easily and effectively reduced. In FIGS. 5A, 5B, and 5C, one rectangular region is equivalent to one pixel, and the size of the rectangular region represents a weight.

Figure 6:
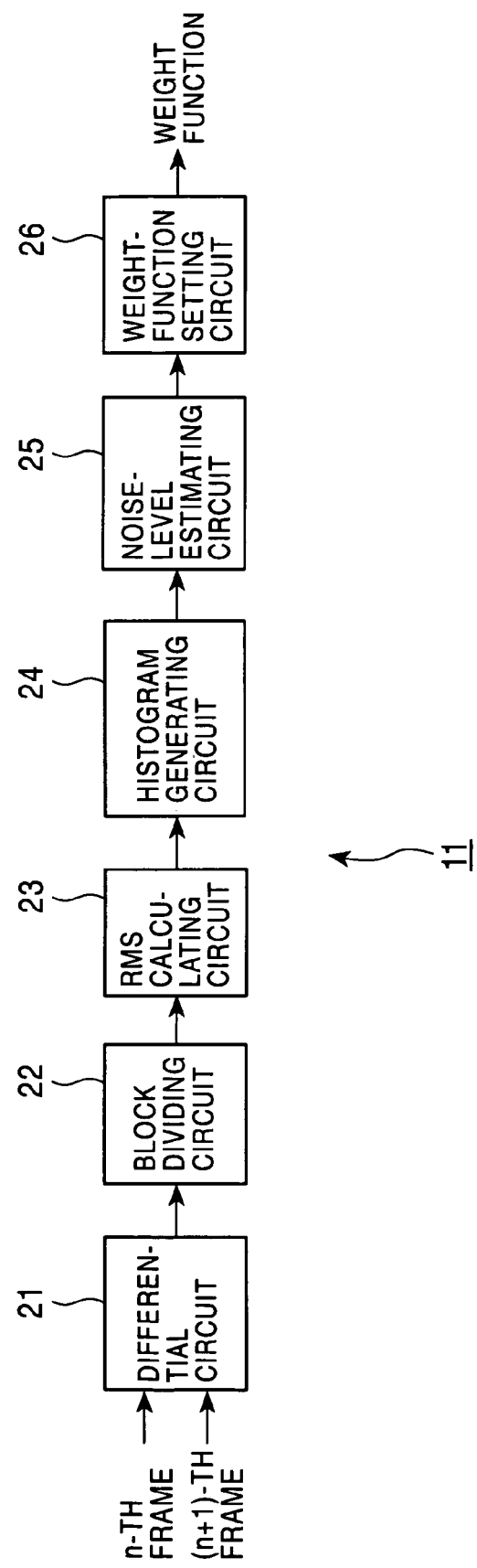
FIG. 6 is a block diagram illustrating the configuration of a weight-function setting portion shown in FIG. 2.

FIG. 6 illustrates the configuration of the weight-function setting portion 11 shown in FIG. 2. It is now assumed that a given frame is the n-th frame. The n-th frame and the subsequent (n+1)-th frame are supplied to a differential circuit 21. The differential circuit 21 calculates a difference between the n-th frame and the (n+1)-th frame and supplies a frame having the calculated difference (a differential frame) to a block dividing circuit 22.

The block dividing circuit 22 divides the differential frame supplied from the differential circuit 21 into blocks, each having a predetermined number of pixels (for example, a 8×16-pixel block), and supplies the blocks to a root mean square (RMS) calculating circuit 23. The RMS calculating circuit 23 calculates the RMS of a pixel difference of each block supplied from the block dividing circuit 22. The RMS of each block is then supplied to a histogram generating circuit 24 from the RMS calculating circuit 23. In the histogram generating circuit 24, an RMS histogram is generated and is supplied to a noise-level estimating circuit 25.

The noise-level estimating circuit 25 estimates the level of noise in the n-th frame, which is a given frame, from the RMS histogram supplied from the histogram generating circuit 24.

More specifically, the noise-level estimating circuit 25 detects the minimum RMS other than zero in the RMS histogram, and outputs the minimum RMS as the level of noise in the given frame. It is now assumed that there is no correlation between signal components and noise components of an image (there is no problem even if this assumption is made for a block having eight or greater pixels in both rows and columns). Statistically, in a differential frame, the RMS of a block having a signal component is greater than that without a signal component. Thus, the RMS of a block without a signal component, i.e., a block containing only noise, appears as the minimum value in the RMS histogram.

It should be noted that the minimum RMS other than zero in the RMS histogram may significantly vary depending on the frame. If the minimum RMS other than zero is simply used as the level of noise, the level of noise may be greatly changed according to the frame. Thus, a weight, for example, $y=e^{-x}$, may be applied to the RMS histogram (a larger weight may be multiplied with a smaller RMS, while a smaller weight may be multiplied with a greater RMS). Then, the weighted means of the weighted RMS may be calculated and used as the level of noise. In this case, the level of noise does not significantly vary according to the frame, and is substantially maintained.

The level of noise estimated in the noise-level estimating circuit 25 is supplied to a weight-function setting circuit 26. In the weight-function setting circuit 26, the standard deviations τ of the Gaussian distribution in the weight functions $W_{Val}$, $W_{Ver}$, $W_{Hor}$, and $W_{Fr}$ are set based on the level of noise of the given frame supplied from the noise-level estimating circuit 25.

More specifically, the weight-function setting circuit 26 increases the standard deviation σ in the weight function $W_{Val}$ for a larger level of noise. In this manner, the standard deviation σ in the weight function $W_{Val}$ is changed according to the level of noise, thereby making it possible to perform optimum NR processing according to the level of noise contained in an original image.

Alternatively, the standard deviations σ in the weight functions $W_{Val}$, $W_{Ver}$, $W_{Hor}$, and $W_{Fr}$ may be set by detecting the amount of motion or the presence or the absence of motion in the original image. That is, the standard deviations a in the weight functions $W_{Ver}$ and $W_{Hor}$ are increased for an image having motion (moving picture). Conversely, the standard deviation a in the weight function $W_{Fr}$ is increased for an image having almost no motion (still image). In this case, NR processing in consideration of the motion of an original image can be performed.

A description is given below with reference to FIGS. 7 through 10 of simulation results obtained by performing NR processing on an image by the image processing unit 2 shown in FIG. 1.

Figure 7:
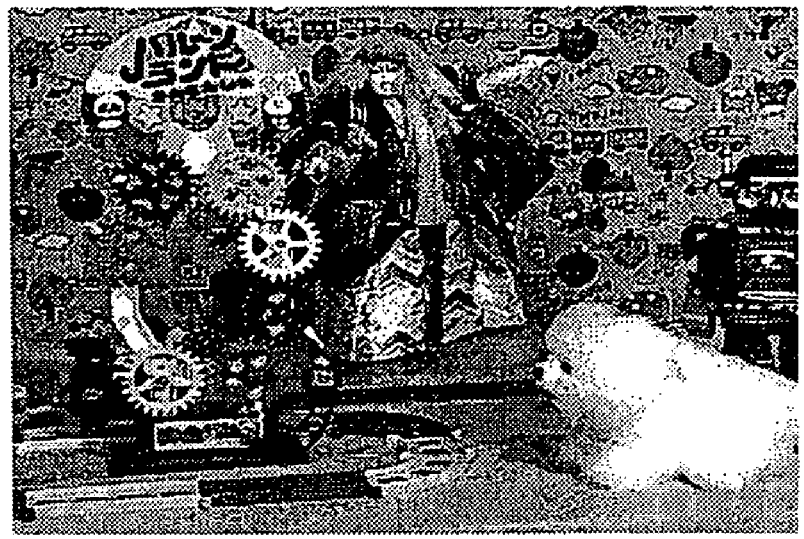
FIG. 7 illustrates an image photograph used in simulations.
Figure 8:
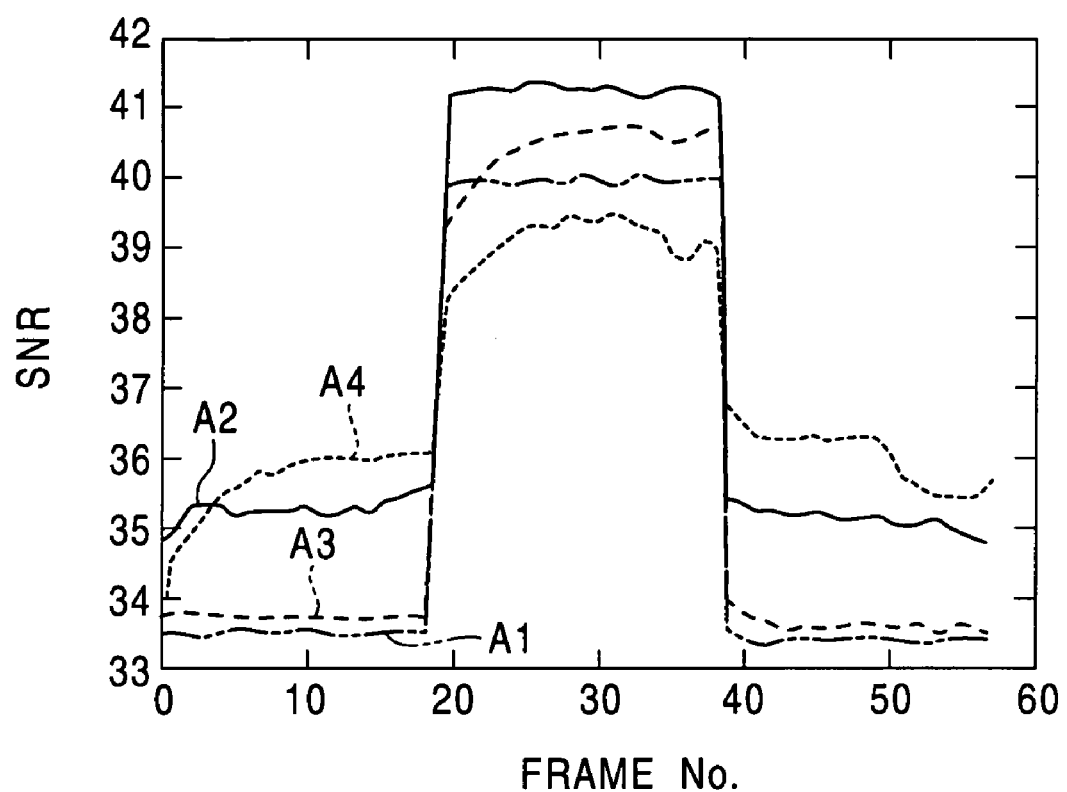
FIG. 8 illustrates simulation results obtained from the image shown in FIG. 7.
Figure 9:
FIG. 9 illustrates an image photograph used in simulations.
Figure 10:
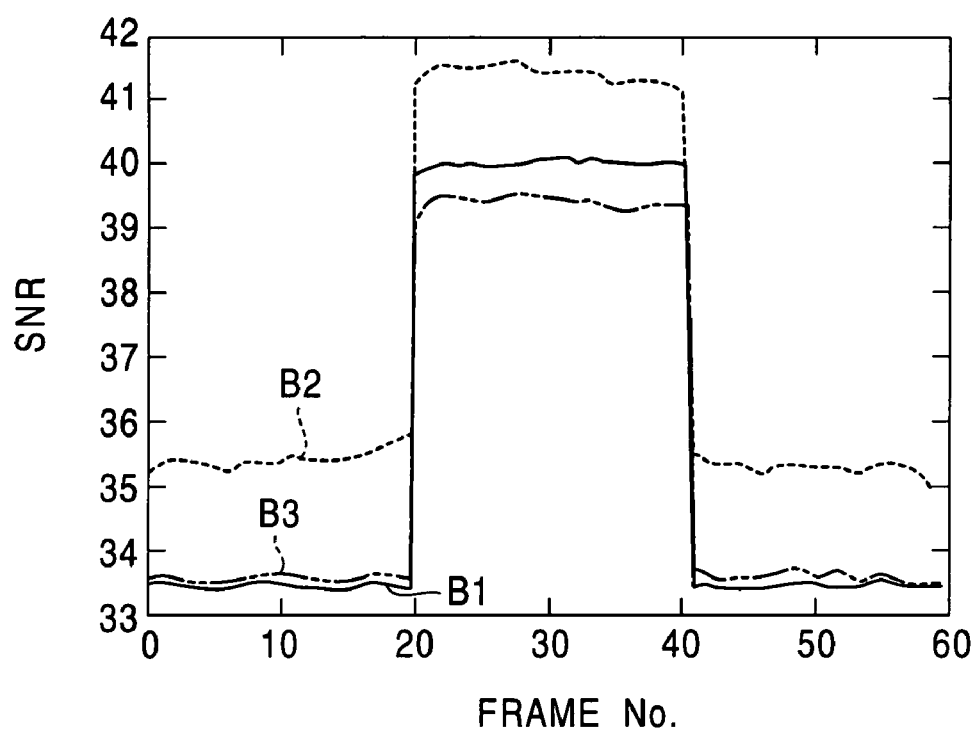
FIG. 10 illustrates simulation results obtained from the image shown in FIG. 9.

FIGS. 7 and 9 illustrate images to be NR-processed. The image shown in FIG. 7 is a still image, while the image shown in FIG. 9 is from a moving picture. FIGS. 8 and 10 illustrate simulation results obtained by the images shown in FIGS. 7 and 9, respectively.

In FIG. 8, a curve A1 represents the S/N ratio of the image shown in FIG. 7, and the S/N ratios of the leading portion and the trailing portion are approximately 33 dB, and the S/N ratio of the intermediate portion is approximately 40 dB.

A curve A2 represents the S/N ratio of an image obtained by executing NR processing on the image shown in FIG. 7 by the image processing unit 2, and curves A3 and A4 represent the S/N ratios of images obtained by performing NR processing on the image shown in FIG. 7 according to a motion-dependent averaging technique (the presence or the absence of motion is first determined, and then, the average of a portion having motion and a portion without motion is calculated). Different S/N ratios represented by A3 and A4 are obtained by varying the values of parameters used for determining the motion.

In FIG. 10, a curve B1 represents the S/N ratio of the image shown in FIG. 9. As in the case of the image shown in FIG. 7, the S/N ratios of the leading portion and the trailing portion of the curve B1 are about 33 dB, and the S/N ratio of the intermediate portion is about 40 dB.

A curve B2 represents the S/N ratio of an image obtained by performing NR processing on the image shown in FIG. 9 by using the image processing unit 2. A curve B3 designates the S/N ratio of an image obtained by executing NR processing on the image shown in FIG. 9 according to the motion-dependent averaging technique.

FIGS. 8 and 10 reveal that noise can be effectively reduced with an improved S/N ratio according to the NR processing by the image processing unit 2 regardless of the type of image, i.e., a still image or a moving picture, and without being influenced of the S/N ratio of the original image.

In the above-described case, among pixels close to a given pixel, pixels spatially and temporally close to the given pixel are extracted. However, concerning the spatial factor, pixels only horizontally or vertically close to the given pixel may be extracted.

The principle of reducing noise (improving the S/N ratio) by extracting pixels close to a given pixel and then by weighting and adding the extracted pixels is as follows. For simple representation, the simplest method, the arithmetic mean, is used as the weighting and adding method.

Figure 11:
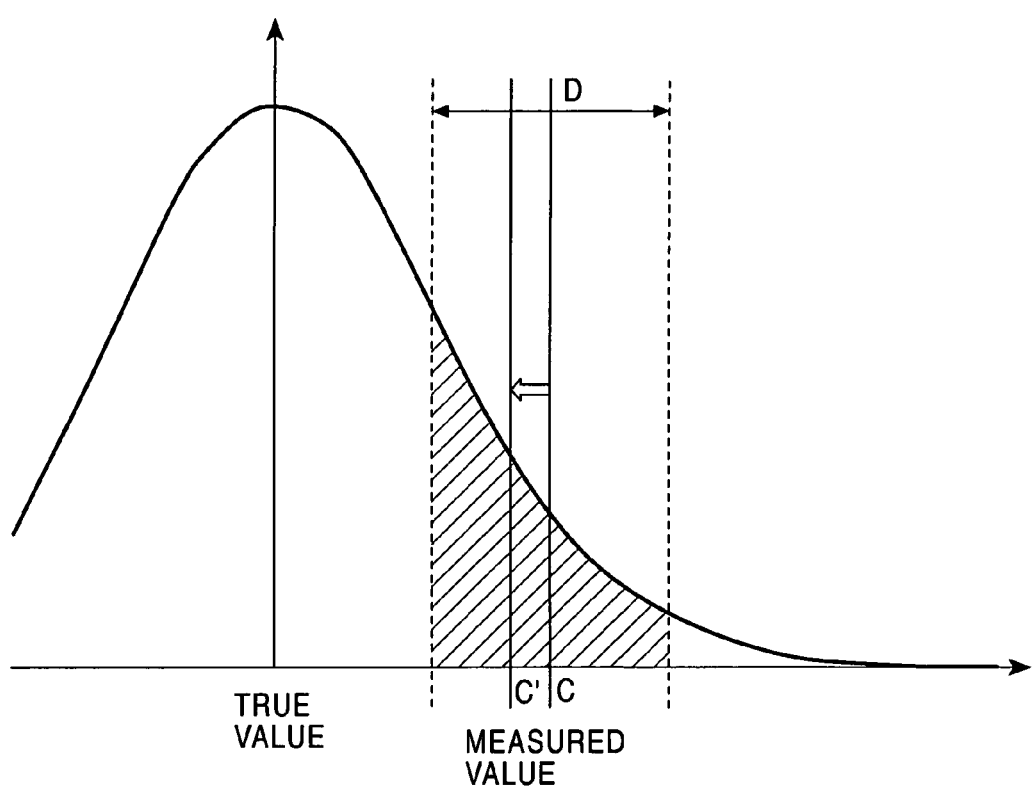
FIG. 11 illustrates the principle of eliminating noise by calculating the weighted mean between a given pixel and pixels similar to the given pixel.

Assuming that the error between a measured value and a true value of a pixel, i.e., noise, is represented by a normal distribution (there is no basic problem even if this assumption is made), a measured value of a pixel is also represented by a normal distribution, as illustrated in FIG. 11.

It is now assumed that a measured value of a given pixel is indicated by C. Pixels close to the measured value C which are designated by D in FIG. 11 are distributed around the measured value C. When the arithmetic mean of the pixels close to the measured value C is indicated by C', the arithmetic mean value C' is equivalent to a value that divides the area indicated by the hatched portion into two equal portions. Accordingly, the following assumption can be made. If the measured pixel value is represented by a normal distribution, the arithmetic mean value C' close to the measured value C approximates to the true value. Thus, by determining the arithmetic mean of the pixels close to the measured value C, noise can be reduced.

Figure 12:
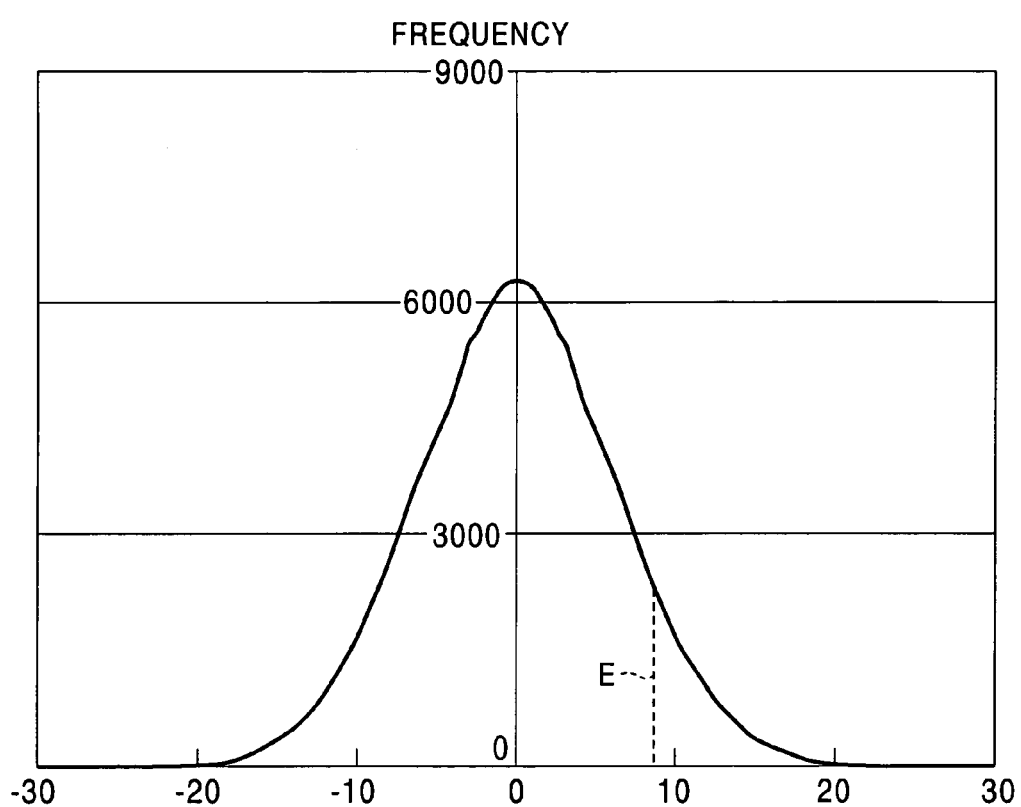
FIG. 12 illustrates the distribution of an error between a measured value and a true value.

FIG. 12 illustrates the distribution of the error between a measured value and a true value of each pixel forming an image. By calculating the arithmetic mean of pixels close to a given pixel, the distribution shown in FIG. 12 is represented by the diagram shown in FIG. 13.

Figure 13:
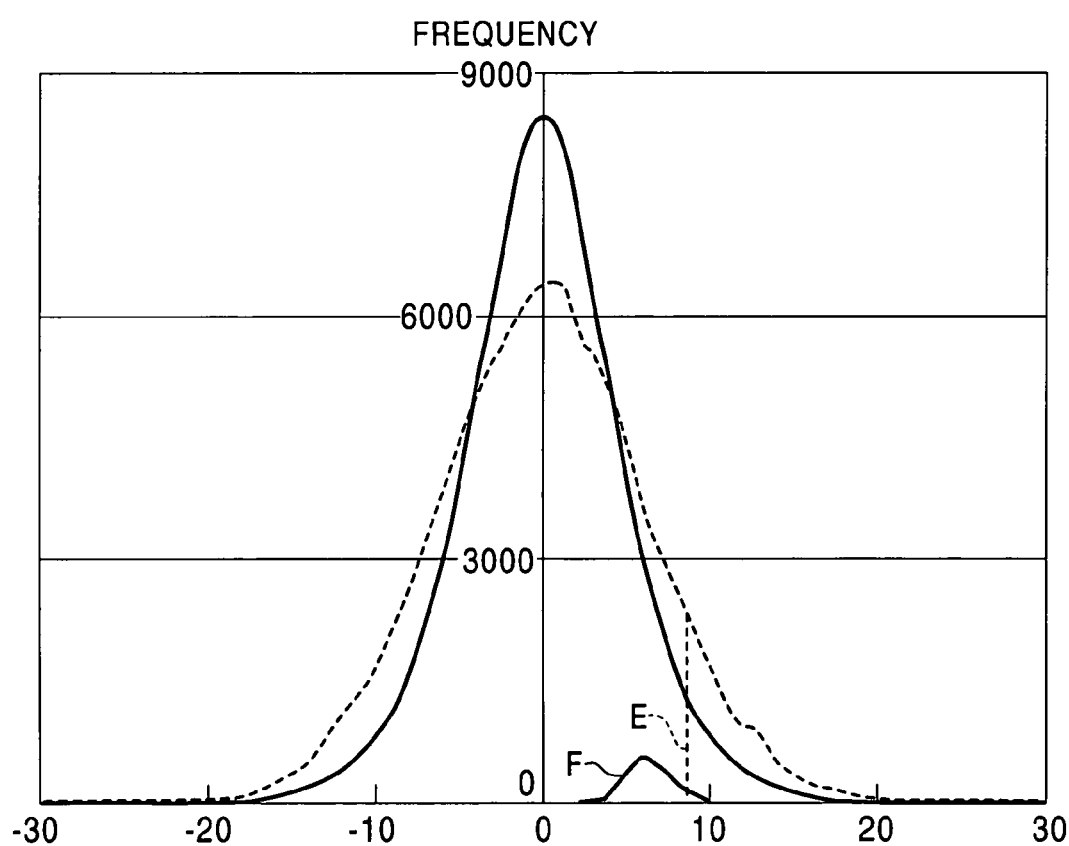
FIG. 13 illustrates the distribution of an error between a measured value and a true value.

More specifically, by calculating the arithmetic mean, the error distribution of the pixel having an error E is indicated by F in FIG. 13. In this case, although there are some pixels having an error greater than the error E, most pixels have an error smaller than the error E. As a result, the error distribution indicated by the solid line in FIG. 13 becomes much sharper than the original distribution (FIG. 12). In other words, the number of pixels having a smaller error is increased.

According to the aforementioned principle of eliminating (reducing) noise, a further noise reduction can be achieved by performing another weighting operation on the pixels with reduced noise. The setting of the standard deviation a of the weight function $W_{Val}$ is equivalent to the setting of the region D of the data to be weighted in FIG. 11.

Figure 14:
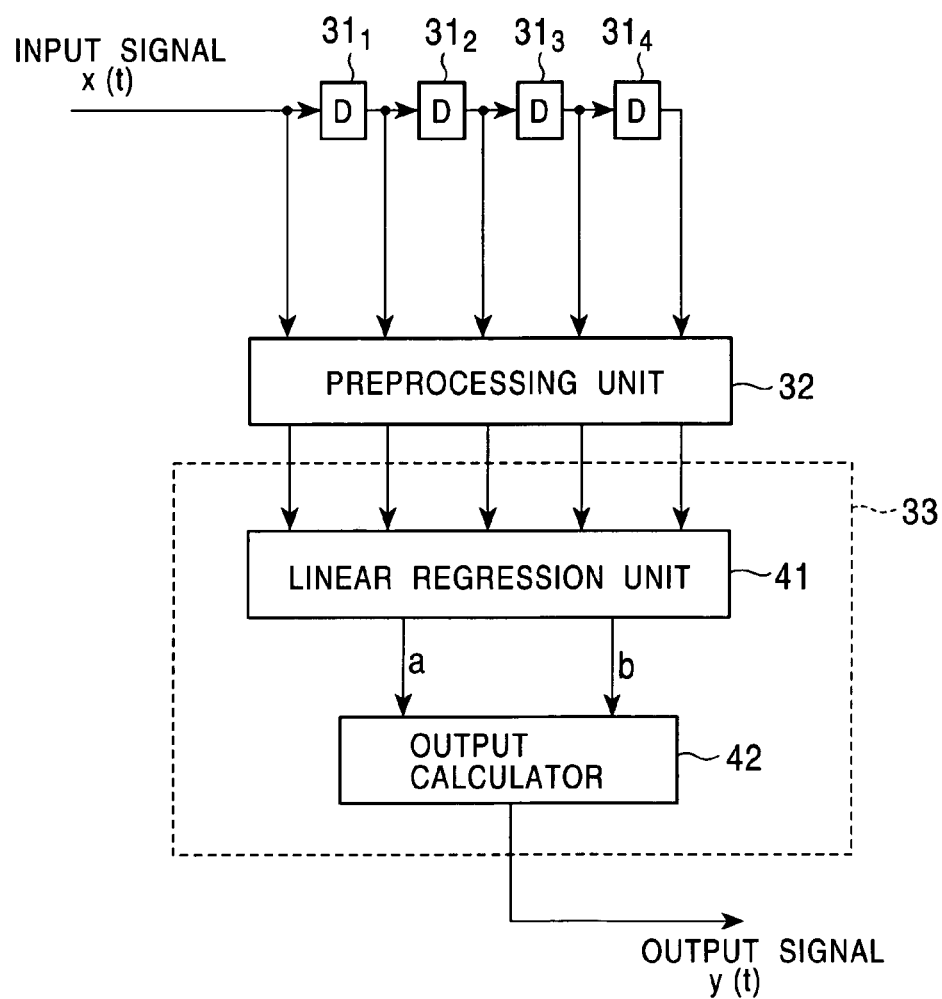
FIG. 14 is a block diagram illustrating the configuration of an NR processing circuit according to a second embodiment of the present invention.

FIG. 14 illustrates the configuration of an NR processing circuit according to a second embodiment of the present invention.

In this NR processing circuit, input data having a value close to given input data is extracted, and by using the extracted input data, noise contained in the given input data is eliminated (reduced).

More specifically, input data is supplied to a latch circuit 31, and a preprocessing unit 32. The latch circuit 311 latches (stores) the supplied input data in synchronization with, for example, the timing at which the input data is supplied, and further supplies it to a subsequent latch circuit 312 and to the preprocessing unit 32. Similarly, the latch circuit 312 or a latch circuit 313 latch the input data supplied from the latch circuits 31, and 312, respectively, and supply it to the subsequent latch circuit 313 and a latch circuit 314, respectively, and to the preprocessing unit 32. The latch circuit 314 latches the input data output from the previous latch circuit 313 and supplies it to the preprocessing unit 32.

If input data x(t+2) is supplied to the latch circuit $31_1$ and the preprocessing unit 32, input data x(t+1), x(t), x(t−1), and x(t−2) latched in the latch circuits $31_1$, $31_2$, $31_3$ and $31_4$, respectively, are also supplied to the preprocessing circuit 32. That is, five consecutive sample data x(t+2) through x(t−2) are simultaneously supplied to the preprocessing unit 32. By performing preprocessing, which will be discussed below, using the center data x(t) as given input data selected from the input sample data x(t+2) through x(t−2), data which are close to the given input data x(t) are extracted from among the five sample data x(t+2) through x(t−2) and are supplied to a modeling unit 33.

The modeling unit 33 performs approximate processing by using the input data from the preprocessing unit 32 based on a predetermined model, thereby determining output data y(t) with respect to the given input data x(t).

More specifically, the modeling unit 33 is formed of a linear regression unit 41 and an output calculator 42. The linear regression unit 41 performs approximate processing by using the input data from the preprocessing unit 32 according to a model represented by a linear expression (straight line), thereby locally modeling the input data. In other words, the linear regression unit 41 forms the input data from the preprocessing unit 32 into a model represented by a linear expression.

Figure 15:
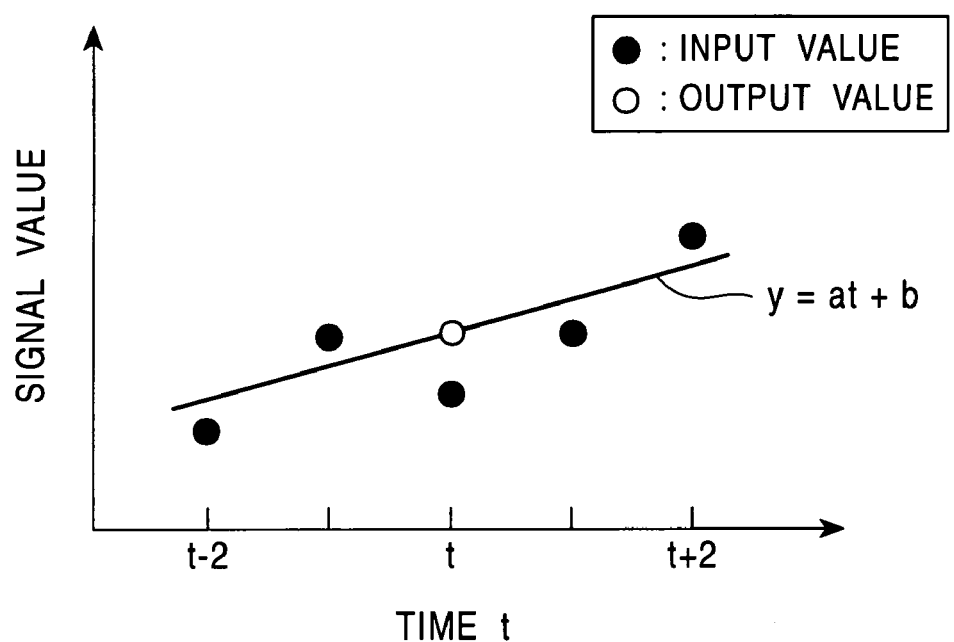
FIG. 15 illustrates modeling of input data.

According to the linear regression, constants a and b that minimize the sum of the squares of the differences between the straight line represented by the linear expression y=at+b and each of the input data (indicated by • in FIG. 15) from the preprocessing unit 32, as shown in FIG. 15, are determined.

Then, the linear regression circuit 41 supplies the determined constants a and b to the output calculator 42. The output calculator 42 calculates expression y(t)=at+b by using the constants a and b, and outputs the resulting value y(t) as output data with respect to the given input data x(t).

Figure 16:
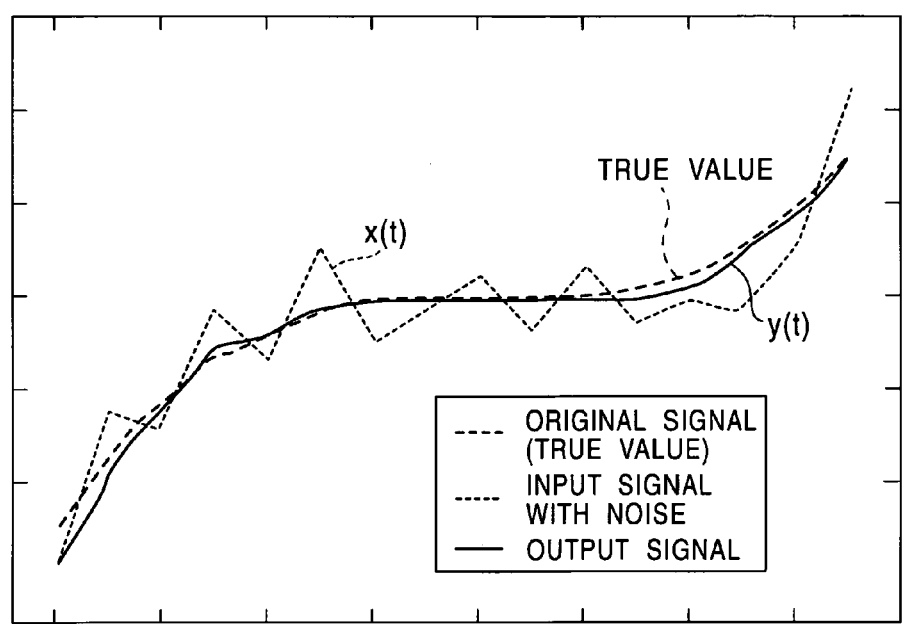
FIG. 16 illustrates processing results obtained by the NR processing circuit shown in FIG. 14.

The foregoing processing is executed on the input data x(t) at each point of time t, thereby obtaining the output data y(t) approximating to a true value with effectively reduced (eliminated) noise (with an enhanced S/N ratio), as illustrated in FIG. 16.

Figure 17:
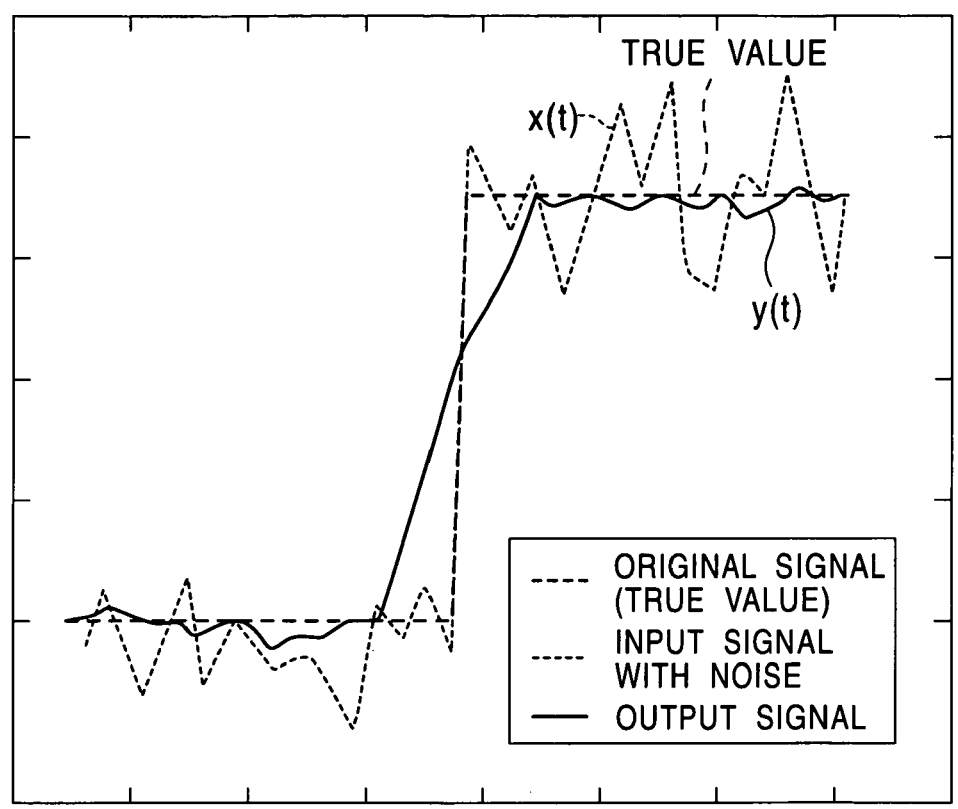
FIG. 17 illustrates processing results obtained by the NR processing circuit shown in FIG. 14.

The model represented by a linear expression is effective when the true value has continuity. If not, for example, if the true value has a discontinuous point, the output data y(t) obtained from the model represented by the linear expression deviates from the true value, as shown in FIG. 17.

Thus, the preprocessing unit 32 extracts only the data that match the model represented by the linear expression from among the five sample input data, and supplies the extracted data to the linear regression unit 41.

Figure 18:
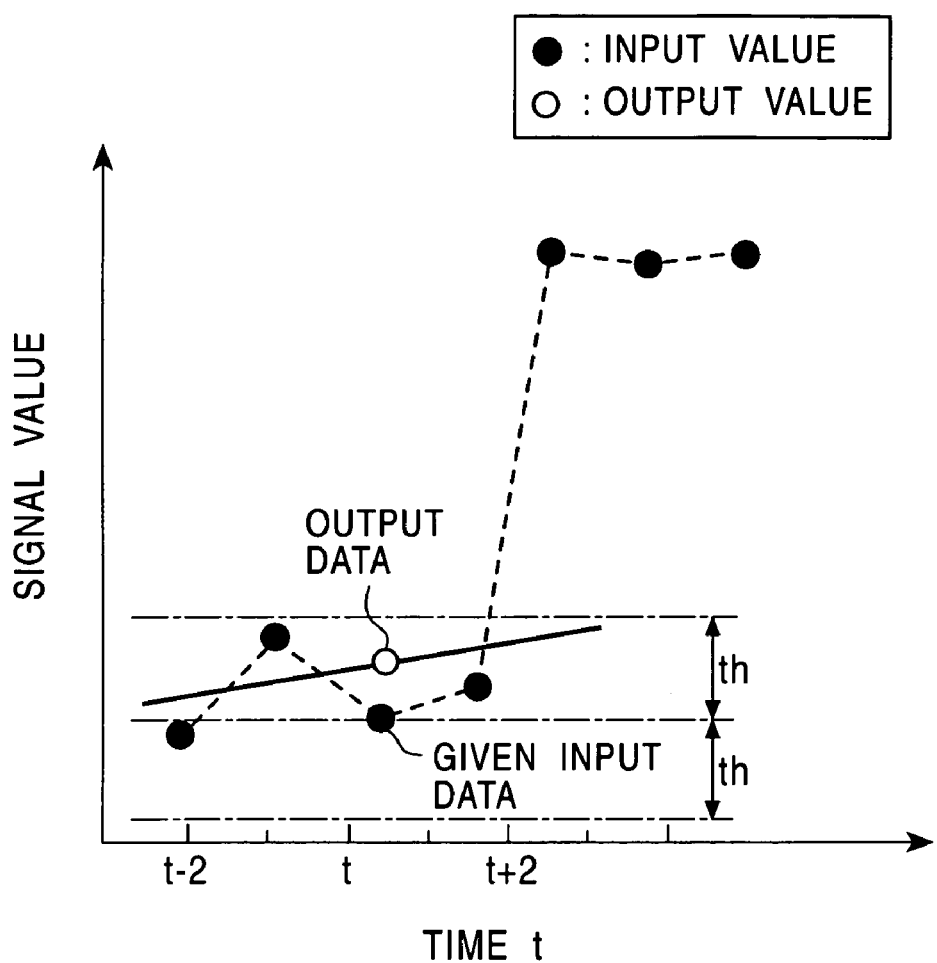
FIG. 18 illustrates the processing of a preprocessing unit shown in FIG. 14.
Figure 19:
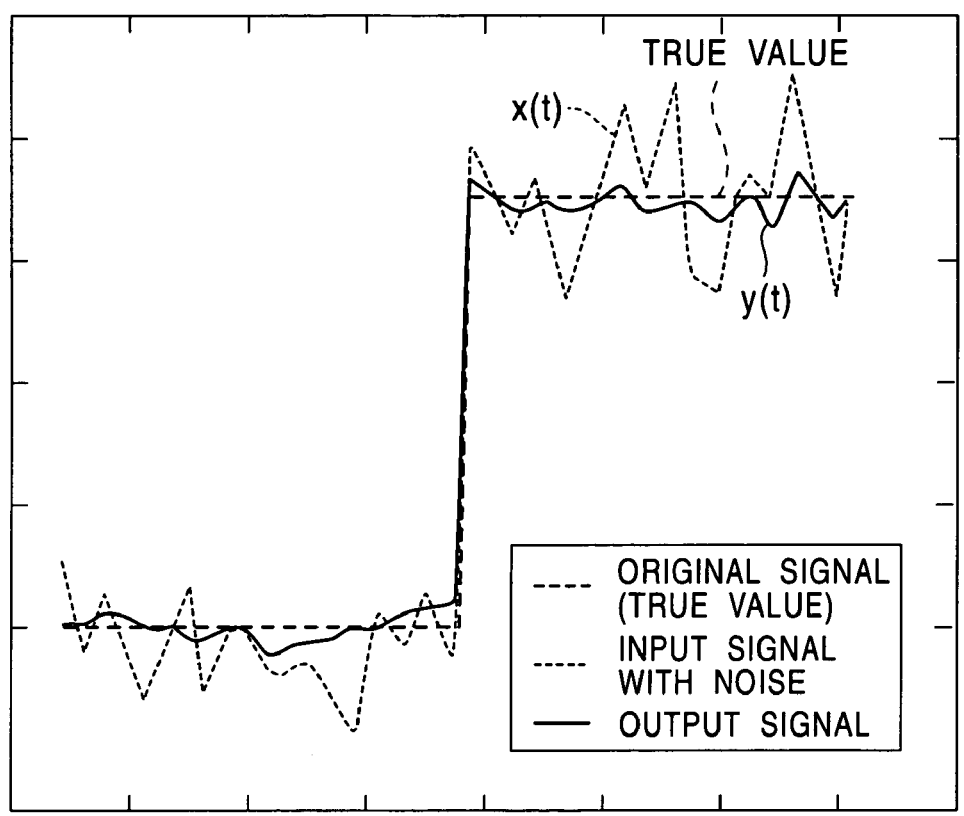
FIG. 19 illustrates processing results obtained by the NR processing circuit shown in FIG. 14.

More specifically, the preprocessing unit 32 calculates an absolute value of the difference (|x(t)−x|) between the given input value x(t) and each of the input data x (in this case, x(t+2) through x(t−2)). Then, only input data having an absolute value equal to or less than a predetermined threshold th are extracted and are supplied to the linear regression unit 41. Accordingly, in the linear regression unit 41, linear regression is performed, as shown in FIG. 18, only on the input data within the threshold ith relative to the given input data, which would otherwise cause the waveform of the output data y(t) to deviate from the true value at the discontinuous point of the true value. That is, even if the true value has a discontinuous point, output data y(t) approximating to the true value can be obtained, as shown in FIG. 19.

Figure 20:
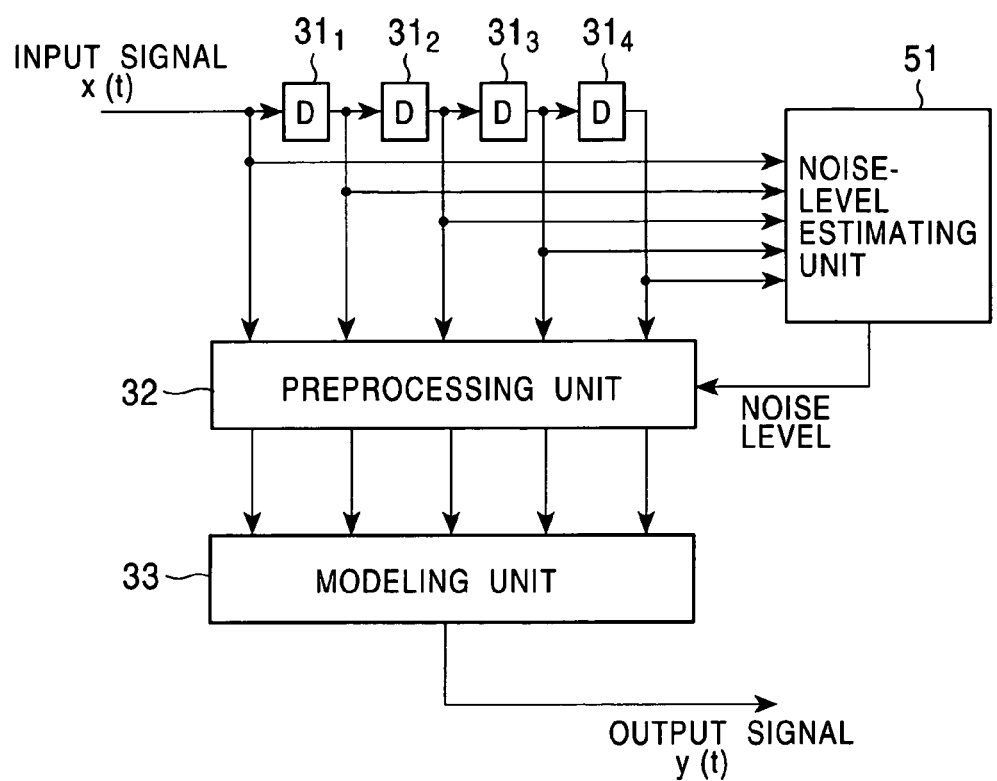
FIG. 20 is a block diagram illustrating the configuration of an NR processing circuit according to a third embodiment of the present invention.

FIG. 20 illustrates the configuration of an NR processing circuit according to a third embodiment of the present invention. The same elements as those shown in FIG. 14 are designated by like reference numerals, and an explanation thereof will thus be omitted. That is, the NR processing circuit shown in FIG. 20 is constructed similarly to the counterpart shown in FIG. 14, except for the provision of a noise-level estimating unit 51.

In the NR processing circuit shown in FIG. 14, the fixed threshold th is used in the preprocessing unit 32. However, in the NR processing circuit shown in FIG. 20, the threshold th used in the preprocessing circuit 32 is adaptively set according to the level of noise contained in input data.

More specifically, the same five sample input data x(t+2) through x(t−2) as those supplied to the preprocessing unit 32 are supplied to the noise-level estimating unit 51. The noise-level estimating unit 51 estimates the level of noise contained in the input data and supplies the estimated level of noise to the preprocessing unit 32. Then, the preprocessing unit 32 sets the threshold th based on the estimated level of noise.

Figure 21:
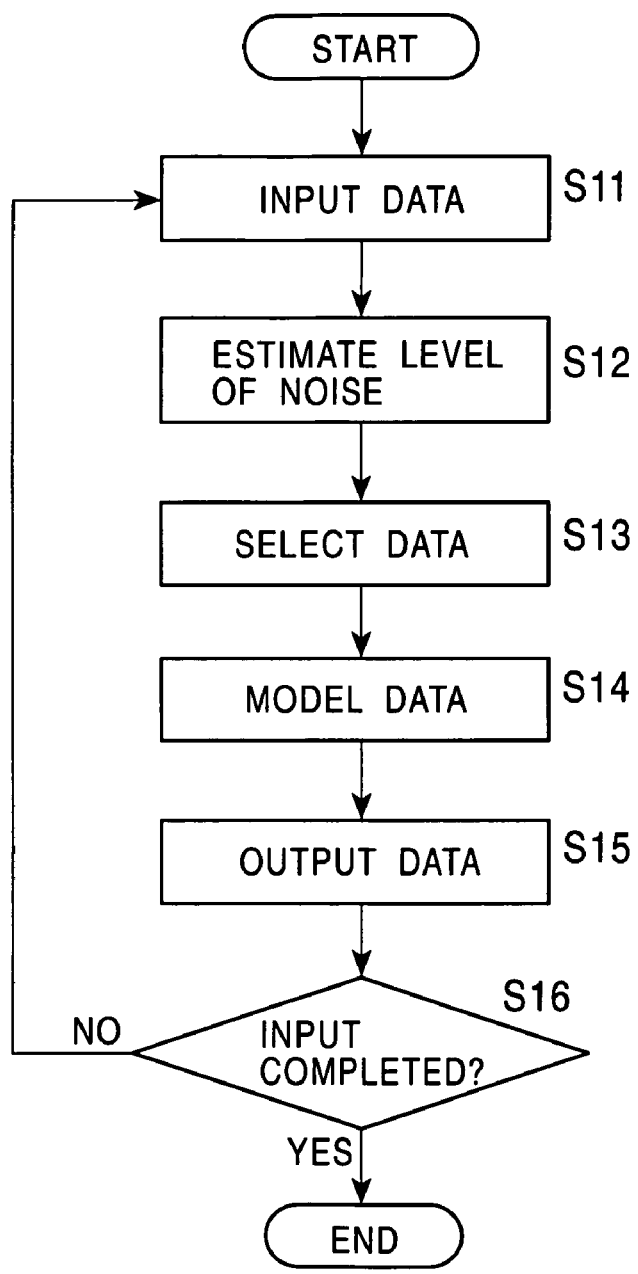
FIG. 21 is a flow chart illustrating the operation of the NR processing circuit shown in FIG. 20.

The operation of the NR processing circuit shown in FIG. 20 is described below with reference to the flow chart of FIG. 21.

In step S11, the five sample input data x(t+2) through x(t−2) are input into the preprocessing unit 32 and the noise-level estimating unit 51. In step S12, the noise-level estimating unit 51 then estimates the level of noise contained in the five sample input data x(t+2) through x(t−2). That is, the noise-level estimating unit 51 calculates the variance of the five sample input data x(t+2) through x(t−2), and estimates the level of noise based on the calculated variance. The estimated level of noise is then supplied to the preprocessing unit 32 from the noise-level estimating unit 51.

In step S13, the preprocessing unit 32 sets the threshold th based on the level of noise estimated by the noise-level estimating unit 51. More specifically, a greater threshold th is set for a greater level of noise, while a smaller threshold th is set for a smaller level of noise. Then, the preprocessing unit 32 calculates an absolute value of the difference between the given input data x(t) and each of the five sample input data x(t+2) through x(t−2), and extracts only the data having an absolute value equal to or less than the threshold th. The extracted input data are supplied to the modeling unit 33.

In step S14, the modeling unit 33 locally models the input data from the preprocessing unit 32, thereby determining constants a and b that define the linear expression y=at +b which best approximates the input data. In step S15, the modeling unit 33 calculates the expression y(t)=at+b by using the constants a and b determined in step S14 and outputs the resulting y(t) as output data with respect to the given input data x(t).

It is then determined by a controller (not shown) in step S16 whether all the input data have been processed. If the outcome of step S16 is no, the process waits for new data to be supplied. The process then returns to step S11, and the corresponding processing is repeated. If it is found in step S16 that all the input data have been processed, the process is then completed.

Figure 22:
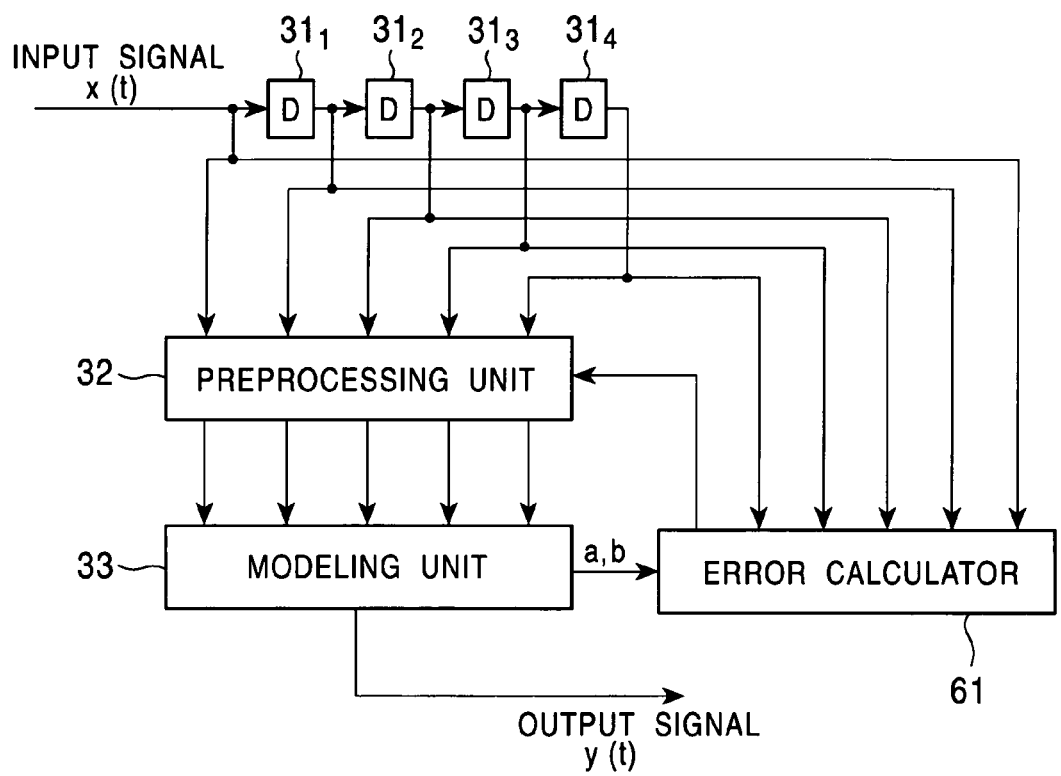
FIG. 22 is a block diagram illustrating the configuration of an NR processing circuit according to a fourth embodiment of the present invention.

FIG. 22 illustrates the configuration of an NR processing circuit according to a fourth embodiment of the present invention. The same elements as those shown in FIG. 14 or 20 are designated by like reference numerals, and an explanation thereof will thus be omitted. That is, the NR processing circuit shown in FIG. 22 is constructed similarly to the counterpart shown in FIG. 14, except for the provision of an error calculator 61.

In the NR processing circuit shown in FIG. 14, the fixed threshold th is used in the preprocessing unit 32. However, in the NR processing circuit shown in FIG. 22, as well as in the counterpart shown in FIG. 20, the threshold th used in the preprocessing unit 32 is adaptively set based on the level of noise contained in the input data. The NR processing circuit shown in FIG. 22 estimates the level of noise based on a modeling error occurring in modeling the input data, though the NR processing circuit illustrated in FIG. 20 estimates the level of noise based on the variance of input data.

More specifically, the five sample input data x(t+2) through x(t−2) and the constants a and b that define the linear expression y=at+b which best approximates the five sample input data are supplied to the error calculator 61.

The error calculator 61 calculates, for example, a modeling error e expressed by the following equation, and estimates the level of noise contained in the input data based on the calculated modeling error e.

$$e = |a \times (t+2) + b - x(t+2)| + |a \times (t+1) + b - x(t+1)| + |a \times t + b - x(t)| + |a \times (t-1) + b - x(t-1)| + |a \times (t-2) + b - x(t-2)| \quad (3)$$

The level of noise calculated in the error calculator 61 is supplied to the preprocessing unit 32. The preprocessing unit 32 then sets the threshold th based on the level of noise, and processing similar to that performed in the NR processing circuit shown in FIG. 20 is performed.

As discussed above, data having a value similar to the given input data are extracted, and the extracted input data are locally modeled. Thus, the input data components which have not been modeled, i.e., noise, can be reduced.

Although in the foregoing embodiments linear data is used as the input data, the present invention may be applied to the input of multi-dimensional data, such as images. If the input data is N dimensional, a model represented by the linear expression used in the linear regression is expressed by the following equation.

$$y = \sum_{i=0}^{N} a_i t_i + c \qquad (4)$$

In the foregoing embodiments, a linear expression is used as a model that approximates the input data. However, another type of model, such as an N-th polynominal or a Bezier curve, which makes it possible to approximate various configurations, may be used.

The technique of approximating the input data is not restricted to linear regression.

Although in the aforementioned embodiments the present invention is described with a view to achieving noise reduction, waveform shaping of input data may be performed.

As is seen from the foregoing description, the data processing method and apparatus of the present invention offers the following advantages. Input data similar to a given input data are extracted, and processing is performed by using the extracted input data, thereby obtaining output data with effectively reduced noise contained in the input data.

What is claimed is:

1. A data processing apparatus comprising:
   input means for receiving input data representative of a plurality of pixels arranged in a sequential order;
   extraction means for extracting from the input data, similar input data having a value close to a value of given input data, said similar input data being temporally and spatially close to the given input data and including said given input data; and
   processing means for processing the similar input data extracted by said extraction means and outputting the output data associated with said given input data;
   wherein the input data to be processed is set as the given input data sequentially.

2. A data processing apparatus according to claim 1, wherein said extraction means extracts the similar input data by applying a weight to the input data according to a difference between the input data and the given input data.

3. A data processing apparatus according to claim 2, wherein said extraction means applies a weight to the input data by multiplying the input data with a predetermined weight function.

4. A data processing apparatus according to claim 3, further comprising setting means for adaptively setting the weight function.

5. A data processing apparatus according to claim 4, further comprising estimation means for estimating a level of noise contained in the input data, wherein said setting means sets the weight function according to the estimated level of noise.

6. A data processing apparatus according to claim 1, wherein said processing means calculates the output data by adding the similar input data which are weighted according to temporal or spatial proximity between the similar input data and the given input data.

7. A data processing apparatus according to claim 6, wherein said processing means applies a weight to the similar input data by multiplying the similar input data with a predetermined weight function.

8. A data processing apparatus according to claim 7, further comprising setting means for adaptively setting the weight function.

9. A data processing apparatus according to claim 8, further comprising estimation means for estimating a level of noise contained in the input data, wherein said setting means sets the weight function according to the estimated level of noise.

10. A data processing apparatus according to claim 1, wherein said extraction means extracts the similar input data from the input data based on a difference between the input data and the given input data.

11. A data processing apparatus according to claim 1, wherein said extraction means extracts input data, as the similar input data, whose difference from the given input data is within a predetermined value.

12. A data processing apparatus according to claim 11, further comprising setting means for adaptively setting the predetermined value.

13. A data processing apparatus according to claim 12, further comprising estimation means for estimating a level of noise contained in the input data, wherein said setting means sets the predetermined value according to the estimated level of noise.

14. A data processing apparatus according to claim 13, wherein said estimation means estimates the level of noise based on a difference between the input data and the corresponding output data or based on a variance of the input data.

15. A data processing apparatus according to claim 1, wherein said processing means calculates the output data by performing approximate processing using the similar input data.

16. A data processing apparatus according to claim 15, wherein said processing means performs the approximate processing according to a predetermined model.

17. A data processing apparatus according to claim 16, wherein said processing means performs the approximate processing according to a model represented by a linear expression.

18. A data processing method comprising:
   an input step for receiving input data representative of a plurality of pixels arranged in a sequential order;
   an extraction step of extracting from the input data similar input data having a value close to a value of given input data, said similar input data being temporally and spatially close to the given input data and including said given input data; and
   a processing step of processing the extracted similar input data and outputting the output data associated with said given input data;
   wherein the input data to be processed is set as the given input data sequentially.

* * * * *